United States Patent
Menard et al.

(10) Patent No.: US 11,004,124 B2
(45) Date of Patent: May 11, 2021

(54) METHOD FOR SIGNING UP A USER TO A SERVICE FOR CONTROLLING AT LEAST ONE VEHICLE FUNCTIONALITY BY MEANS OF A USER TERMINAL

(71) Applicant: VALEO COMFORT AND DRIVING ASSISTANCE, Créteil (FR)

(72) Inventors: Eric Menard, Créteil (FR); Bruno Benteo, Créteil (FR); Fabienne Masson, Créteil (FR)

(*) Notice: Subject to any disclaimer, the term of this patent is extended or adjusted under 35 U.S.C. 154(b) by 386 days.

(21) Appl. No.: 15/540,347

(22) PCT Filed: Dec. 22, 2015

(86) PCT No.: PCT/FR2015/053719
§ 371 (c)(1),
(2) Date: Jun. 28, 2017

(87) PCT Pub. No.: WO2016/108012
PCT Pub. Date: Jul. 7, 2016

(65) Prior Publication Data
US 2018/0012272 A1    Jan. 11, 2018

(30) Foreign Application Priority Data

Dec. 30, 2014  (FR) .................... 1463430

(51) Int. Cl.
| | |
|---|---|
| *G06Q 30/06* | (2012.01) |
| *H04W 12/06* | (2021.01) |
| *H04L 9/00* | (2006.01) |
| *H04L 29/06* | (2006.01) |
| *H04L 9/32* | (2006.01) |

(Continued)

(52) U.S. Cl.
CPC ......... *G06Q 30/0609* (2013.01); *G06F 21/35* (2013.01); *G06F 21/44* (2013.01);
(Continued)

(58) Field of Classification Search
CPC ..... G06Q 30/0609; G06F 21/35; G06F 21/44; G06F 2221/2103; G06F 2221/2117;
(Continued)

(56) References Cited

U.S. PATENT DOCUMENTS

| | | |
|---|---|---|
| 6,253,980 B1 | 7/2001 | Murakami et al. |
| 8,646,060 B1 * | 2/2014 | Ben Ayed ........... H04L 63/0853 726/9 |

(Continued)

FOREIGN PATENT DOCUMENTS

| | | |
|---|---|---|
| WO | 01/61604 A1 | 8/2001 |
| WO | 2008/044093 A1 | 4/2008 |

OTHER PUBLICATIONS

International Search Report issued in PCT/FR2015/053719 dated Mar. 11, 2016 (3 pages).

(Continued)

*Primary Examiner* — Samson B Lemma
*Assistant Examiner* — Zoha Piyadehghibi Tafaghodi
(74) *Attorney, Agent, or Firm* — Osha Bergman Watanabe & Burton LLP

(57) ABSTRACT

A method for signing up a user to a service for controlling at least one functionality in a vehicle (10) by means of a user terminal (20) comprises the following steps: —communicating a user identifier and an identifier associated with the vehicle (10) to a server (50); —having the server (50) authenticate an electronics unit (11) of the vehicle (10); —in the event of successful authentication, registering the user identifier and the identifier associated with the vehicle (10) in association with one another in the server (50).

17 Claims, 3 Drawing Sheets

(51) Int. Cl.
*G06F 21/44* (2013.01)
*G06F 21/35* (2013.01)
*H04W 12/041* (2021.01)
*H04W 8/18* (2009.01)
*B60R 25/24* (2013.01)

(52) U.S. Cl.
CPC .............. *H04L 9/006* (2013.01); *H04L 9/321* (2013.01); *H04L 9/3273* (2013.01); *H04L 63/0853* (2013.01); *H04L 63/0869* (2013.01); *H04W 12/041* (2021.01); *H04W 12/06* (2013.01); *B60R 25/24* (2013.01); *G06F 2221/2103* (2013.01); *G06F 2221/2117* (2013.01); *H04L 2209/84* (2013.01); *H04W 8/18* (2013.01)

(58) Field of Classification Search
CPC ....... H04L 9/006; H04L 9/321; H04L 9/3273; H04L 63/0853; H04L 63/0869; H04L 2209/84; H04W 12/00; H04W 12/06; H04W 8/18; B60R 25/24
USPC .......................................................... 713/151
See application file for complete search history.

(56) References Cited

U.S. PATENT DOCUMENTS

| | | | |
|---|---|---|---|
| 2003/0034873 A1* | 2/2003 | Chase | G06Q 10/02 340/5.2 |
| 2005/0037734 A1* | 2/2005 | Tanaka | H04M 1/72533 455/411 |
| 2005/0219036 A1* | 10/2005 | Ueda | B60R 25/2036 340/5.62 |
| 2006/0072756 A1 | 4/2006 | Leimgruber et al. | |
| 2009/0207004 A1* | 8/2009 | Ziska | B60R 25/2018 340/426.1 |
| 2010/0148923 A1 | 6/2010 | Takizawa | |
| 2011/0144844 A1* | 6/2011 | Ishibashi | G07F 15/005 701/22 |
| 2012/0095642 A1 | 4/2012 | Nishida | |
| 2016/0330204 A1* | 11/2016 | Baur | H04L 67/34 |

OTHER PUBLICATIONS

Written Opinion of the International Searching Authority issued in PCT/FR2015/053719 dated Mar. 11, 2016 (7 pages).

* cited by examiner

METHOD FOR SIGNING UP A USER TO A SERVICE FOR CONTROLLING AT LEAST ONE VEHICLE FUNCTIONALITY BY MEANS OF A USER TERMINAL

TECHNICAL FIELD TO WHICH THE INVENTION RELATES

The present invention relates to the control of functions of a vehicle by means of a user terminal such as a cellphone.

More particularly, it relates to a method for signing up a user to a service for controlling a function of a vehicle by means of a user terminal.

The invention may be applied in a particularly advantageous manner in the case where this function is the unlocking of the doors of the vehicle.

PRIOR ART

Proposals have been made for the control of certain functions of a motor vehicle, such as unlocking the vehicle doors, by means of a user terminal, for example a cellphone commonly used by the vehicle user.

In order to restrict this control to persons who have actually been authorized, a virtual key stored in the user terminal is used, the validity of this virtual key being validated by an electronic control unit of the vehicle before the unlocking of the doors is commanded.

Such virtual keys are distributed solely to persons who have signed up to a service for controlling functions by means of the user terminal.

OBJECT OF THE INVENTION

In this context, the present invention proposes a method for signing up a user to a service for controlling at least one function of a vehicle by means of a user terminal, characterized in that it comprises the following steps:
communicating an identifier of the user and an identifier associated with the vehicle to a server;
having an electronics unit of the vehicle authenticated by the server;
if the authentication is successful, signing up the user's identifier and the identifier associated with the vehicle, in association, at the server.

Thus the vehicle is signed up to the service, in association with the user identifier (which may be an identifier of his user terminal, for example), only if an electronics unit of the vehicle designated by the communicated identifier has been authenticated at the server.

Other characteristics, which are optional and therefore non-limiting, are as follows:
the authentication comprises a step in which the server uses a cryptographic key stored in association with a reference of the electronics unit;
the authentication comprises data exchanges between the server and the electronics unit via the user terminal;
the authentication step forms part of a mutual authentication process between the server and the electronic control unit;
the sign-up method comprises a step of detecting an action performed by the user on a physical object linked to the vehicle;
the sign-up is conditional not only on the successful authentication, but also on the aforesaid detection;
the detection step is performed solely if the authentication has been successful;
the sign-up method comprises, if the detection is successful, a step in which the electronics unit sends a service start message to the server, said sign-up being performed by the server on receipt of the service start message;
the method comprises, following said sign-up, a step of transmitting a virtual key to the terminal;
the physical object is a physical key capable of controlling the unlocking of the doors of the vehicle;
the physical object is a manual control of the vehicle;
the user identifier is an identifier of the user terminal;
the method further comprises, if the authentication is successful, a step of initializing a counter in the server and in the electronics unit;
the counter is initialized, in the initialization step, with an initialization value stored in the server and in the electronics unit;
the counter is incremented periodically, the period being stored in the server and in the electronics unit;
the communication step is performed by transmitting, via the user terminal for example, the user identifier and the identifier associated with the vehicle;
the communication step is performed by acquiring, at the server, the user identifier and the identifier associated with the vehicle.

The sign-up method may also comprise the following steps:
downloading, from the server to the terminal, an application (pre-customized for example) containing a specific message intended for an electronic control entity corresponding to the identifier associated with the vehicle;
transmitting, as a result of the execution of the application on the terminal, the specific message to the control unit of the vehicle.

The function is, for example, the unlocking or locking of the doors of the vehicle, or the locking or unlocking of the trunk of the vehicle, or the locking or unlocking of the glovebox of the vehicle, or alternatively the starting or stopping of the vehicle engine.

DETAILED DESCRIPTION OF AN EXEMPLARY EMBODIMENT

The following description, referring to the attached drawings which are provided by way of non-limiting example, will make the nature and application of the invention clear.

In the attached drawings:

FIG. 1 shows an example of a context in which the invention may be applied.

Figure 1:
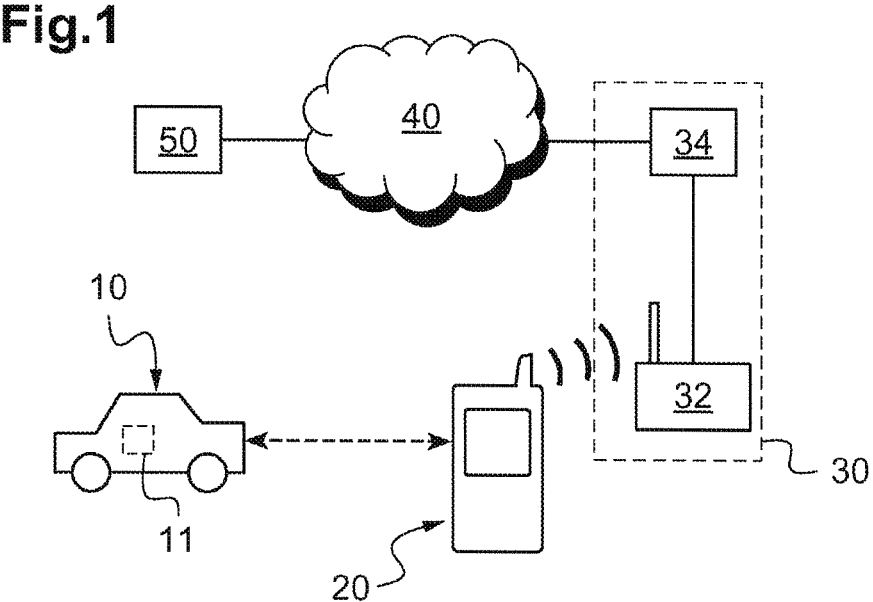
FIG. 1 shows an example of a context in which the invention may be applied, comprising, notably, a vehicle and a user terminal.

In this context, a vehicle 10 comprises an electronic control unit 11 (or ECU, for "Electronic Control Unit"), which is capable of entering into communication via a wireless link with a user terminal 20, for example a cellphone (or mobile phone), possibly of the "intelligent telephone" type, also known as a "smartphone" according to the commonly used English name, in order to exchange data with this user terminal 20, for example in order to control functions of the motor vehicle 10 by means of the user terminal 20 (such a function possibly being, for example, unlocking the doors of the vehicle 10), as explained below.

The wireless link used for communication between the electronic control unit 11 and the user terminal 20 is of the Bluetooth type, for example.

The user terminal 20 is also designed to connect to a cellphone network 30 which comprises, notably, a base station 32 in communication via a radio link with the user terminal 20 and a gateway 34 for connection to a public network 40, for example the internet.

A server 50 is also connected to the public network 40 in such a way that the user terminal 20 and the server 50 can communicate and exchange data via the cellphone network 30 and the public network 40. In this case, the server 50 is managed by the manufacturer of the electronic control unit 11.

Figure 2:
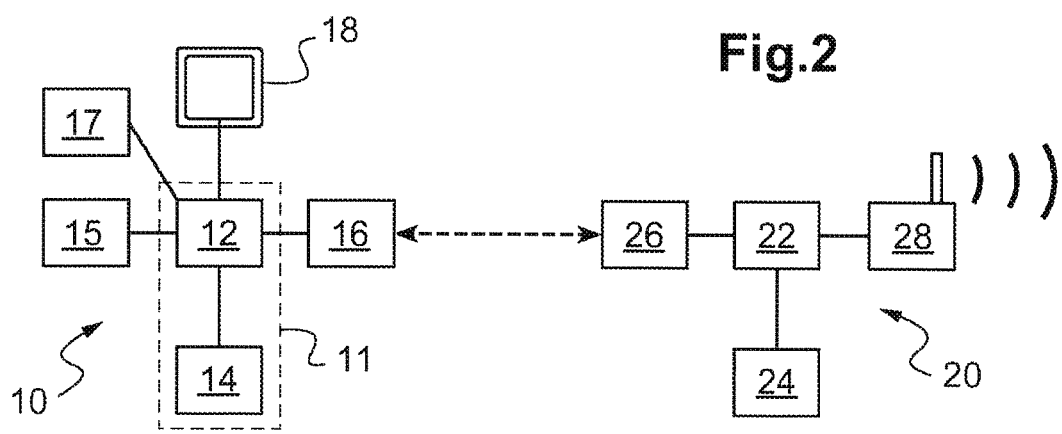
FIG. 2 shows schematically components, useful for the understanding of the invention, of the motor vehicle and of the user terminal of FIG. 1.

FIG. 2 shows schematically some components, which are useful for the understanding of the invention, of the vehicle 10 and of the user terminal 20.

The motor vehicle 10 comprises, notably, the aforementioned electronic control unit 11, an actuator 15 (designed in this case for unlocking the doors of the vehicle 10), an actuator 17 (designed for starting the vehicle), a wireless communication module 16, and a user interface 18.

An identification number VID is assigned to the vehicle 10, and a serial number N is assigned to the electronic control unit 11. The association between the identification number VID of a vehicle 10 and the serial number N of the electronic control unit 11 fitted to this vehicle 10 is stored in a database D managed by the server 50 (which may be the manufacturer of the vehicle 10 or a supplier).

The electronic control unit comprises a processor 12 and a storage unit 14, for example a rewritable non-volatile memory or a hard disk.

The storage unit 14 stores, notably, computer programs comprising instructions whose execution by the processor 12 enables the electronic control unit 11 to execute the methods described below.

The storage unit 14 also stores data used in the context of the methods described below, notably a cryptographic key PrK (for example, a private key) and root key (or master key) MK, used as explained in the following text.

The cryptographic key PrK and/or the root key MK are, for example, written to the storage unit 14 during the manufacture of the electronic control unit 11, before this electronic control unit 11 is installed in the motor vehicle 10.

The cryptographic key PrK and the root key MK are also stored at the server 50 (which, as will be recalled, is managed by the manufacturer of the electronic control unit 11), in association with the serial number N of the electronic control unit 11.

In some applications described below, the storage unit 14 also stores information for the construction of a diversified counter, for example an initial value I of the counter and a step duration P. This information may also be written to the storage unit 14 during the manufacture of the electronic control unit 11, before this electronic control unit 11 is installed in the motor vehicle 10, and may additionally be stored at the server 50, in association with the serial number N of the electronic control unit 11.

This counter is diversified in the sense that the information for the construction of the counter (in this case the initial value I and the step duration P) differ from one electronic control unit to another, and therefore from one vehicle to another. In other words, each electronic control unit (and therefore each vehicle) stores its own counter construction information. Thus the server S stores, as mentioned above, this counter construction information in association with each electronic control unit serial number.

The user terminal 20 comprises a processor 22, a memory 24 (a rewritable non-volatile memory, for example), a wireless communication module 26, and a module 28 for communication on the cellphone network 30.

The wireless communication module 26 of the mobile terminal 20 enables a wireless link (of the aforementioned Bluetooth type in this case) to be established with the wireless communication module 16 of the vehicle 10, through which the processor 12 of the electronic control unit 11 and the processor 22 of the user terminal 20 can exchange data, notably as described below.

The communication module 28 enables the user terminal 20 (or more precisely the processor 22 fitted in this user terminal 20) to exchange data, as mentioned above, with other devices connected to the cellphone network 30 or to the public network 40, notably with the server 50. In some embodiments, the communication module may comprise a smart card which stores connection data associated with a subscription to the cellphone service and enabling the connection to be established on the cellphone network 30.

Figure 3:
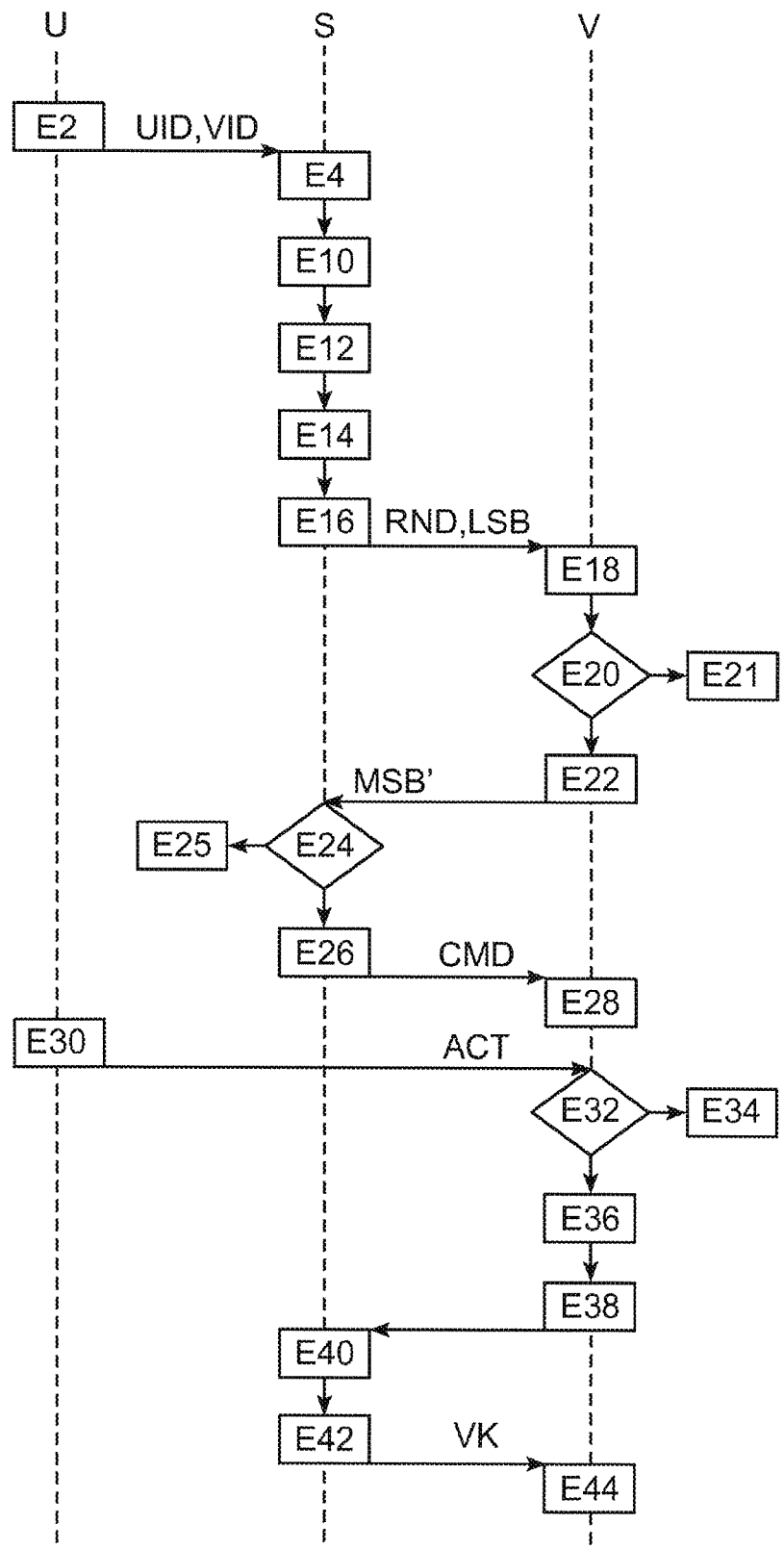
FIG. 3 shows the main steps of a method for signing up to a service for controlling functions of the vehicle by means of the user terminal.

FIG. 3 shows the main steps of a method for signing up to (or enrolling in) a service for controlling functions of the vehicle 10 by means of the user terminal 20.

It should be noted that, before the execution of this method, the user terminal 20 is not specifically prepared for the control of functions of the vehicle 10, and comprises no data associated with the vehicle 10. The terminal may therefore be, for example, the cellphone currently used by the owner of the vehicle 10.

Similarly, before the execution of the method, the user terminal 20 is unknown to the vehicle 10, which therefore has no knowledge of any data associated with this user terminal 20.

It is assumed that, for the execution of the method of FIG. 3, a user U (in one embodiment, this is the owner of the vehicle 10, while in another embodiment it is a person responsible for putting the vehicle 10 into operation) has access to the vehicle 10 (also referenced "V" in FIG. 3) by conventional means (such as a physical key).

In the embodiment described here, the user U carries and uses the user terminal 20 which, as described above, communicates, on the one hand, with the electronic control unit 11 via a wireless link (of the Bluetooth type, for example) and, on the other hand, with the server 50 (referenced "S" in FIG. 3) via a radio link to the base station 31, then via the cellphone network 30 and the public network 40.

The user terminal 20 may thus be used, in the embodiment described here, as a gateway for the exchange of data between the vehicle V (more precisely, the electronic control unit 11) and the server S, as described below.

In a variant, it would be possible to use other means of communication between the vehicle V (i.e. the electronic control unit 11) and the server S, for example a communication module (sometimes called a "Telematic Control Unit") fitted in the vehicle V and designed to establish (direct) communication between the vehicle V and the cellphone network 30.

The method of FIG. 3 starts at step E2, in which the user U communicates to the server S (referenced "50" in FIG. 1) a user identifier UID and an identifier VID of the vehicle V (referenced "10" in FIG. 1). In a feasible embodiment, the user U connects for this purpose to the server S (for example by entering the http address of the server S into a browser executed by the processor 22 of the user terminal 20), and enters, for example, the aforesaid identifiers UID, VID into a form which is then transmitted to the server S. In another feasible embodiment, an application installed previously on the user terminal 20 requests the user U to enter the identifiers and transmits them to the server 50.

In a variant, the user identifier UID and the identifier VID of the vehicle V may have been entered previously at the server S, for example when the vehicle V was purchased.

The user identifier UID comprises, for example, the user's surname and forename(s), and his date of birth if required. However, in a variant, another type of data could be used to identify the user; thus, the user identifier could be an email address, a telephone number (for example the number, such as an MSISDN number, assigned on subscription to the cellphone service) or an identifier of the user terminal of the user U (such as an IMEI number).

The vehicle identifier VID is, for example, of the type known as a "Vehicle Identification Number". However, in a variant, it would be possible to use another identifier associated with the vehicle 10, notably the serial number N of the electronic control unit 11 of the vehicle 10.

The server S receives the user identifier U and the vehicle identifier VID in step E4 and stores these identifiers, in this step, in an area dedicated to vehicles for which the sign-up to the service for controlling functions of the vehicle by means of the user terminal is in progress.

The serial number N of the electronic control unit 11 is, for example, communicated by the user U to the server S, in step E2 for example. For this purpose, the serial number N is supplied in advance to the user: it is, for example, printed on a label pasted into the user manual of the vehicle, and/or accessible to the user via the user interface 18.

The server S can thus determine, in step E10, the cryptographic key PrK which has been stored (as described above) in association with this serial number N.

The server S then generates a "challenge" (as it is known in English), for example a random number RND (step E12).

The server S then calculates, in step E14, a response RESP associated with this challenge, by applying a cryptographic function f using the cryptographic key PrK, which may be written thus: RESP=f(RND,VK).

The server S can thus send, in step E16, the challenge RND and part of the response RESP, in this case a least significant byte (LSB, for "Least Significant Byte") forming part of the response RESP, to the vehicle V, or more precisely the electronic control unit 11.

It will be recalled, as mentioned above, that in this case the server S (referenced "50" in FIG. 1) communicates with the electronic control unit 11 via the user terminal 20.

The electronic control unit 11 receives the challenge RND and the part of the response LSB, and then, in its turn, calculates the expected response RESP' in step E18, by applying the cryptographic function f to the challenge received, using the cryptographic key PrK which has been stored as mentioned above in the storage unit 14: RESP'=f(RND,PrK).

The electronic control unit 11 then verifies, in step E20, that the part LSB' (corresponding to the part of the response RESP received, in this case the least significant byte) of the response RESP' calculated in step E18 is actually equal to the part of the response LSB received from the server S.

If this equality is not verified, the electronic control unit 11 proceeds to step E21 which terminates the sign-up process. In fact, this means that the cryptographic key used in the calculation in step E14 differs from that used in the calculation in step E18, and that an error has therefore occurred (because an incorrect vehicle identifier was sent in step E2, for example). An error message may then, for example, be displayed on the user interface 18 of the vehicle V.

If the equality is verified, then in step E22 the electronic control unit 11 sends another part of the response RESP' calculated in step E18, in this case a most significant byte MSB' (for "Most Significant Byte"), to the server S.

The server S receives this other part MSB' of the response RESP', and verifies, in step E24, that the part MSB (corresponding to the part MSB' of the response RESP' received, in this case the most significant byte) of the response RESP calculated in step E14 is actually equal to the part of the response MSB received from the electronic control unit 11.

If this equality is not verified, the server proceeds to step E25, which terminates the sign-up processor. This means that the partner of the server S in the communication has not been able to calculate the expected response, probably because the partner is not the expected vehicle and therefore does not hold the cryptographic key PrK.

In normal operation, the equality is verified and a mutual authentication has thus been performed between the server S and the electronic control unit 11.

The server S then initiates the continuation of the sign-up method by sending to the electronic control unit 11 a command CMD to verify the presence of the user U in the vehicle V (step E26).

On receipt of the command CMD, the electronic control unit 11 causes the user interface 18, in step E28, to generate an indication requesting the user U to perform one or more actions ACT.

This indication may be a visual indication (for example a light signal or a display on a screen of the user interface 18) and/or an audible indication (for example a particular sound, or a voice message). The requested action or actions may comprise the use of the physical key (for example pressing one or more buttons on the physical key, possibly simultaneously, or starting and/or stopping the engine with the physical key) and/or an action performed by the user U on the vehicle V, for example pressing a button on the user interface 18, opening and/or closing a door, and/or starting and/or stopping the engine.

The user performs the requested action (or actions) ACT in step E30.

The electronic control unit 11 detects, in step E32, whether the action performed by the user U actually corresponds to the requested action ACT (for example, while allowing the user a predetermined period for the completion of the action).

In case of failure (that is to say, if the user U does not perform the requested actions within the time interval allowed), the electronic control unit 11 proceeds to step E34 which terminates the sign-up process. An error message may also be displayed on the user interface 18 of the vehicle V.

On the other hand, if the user correctly performs the requested actions ACT within the time allowed, all the conditions for carrying out the sign-up are considered to have been met, and the service for controlling functions of the vehicle by means of the user terminal can be started.

It should be noted that other conditions for the validation of the sign-up may be feasible: for example, the entry of a one-time code, received and displayed by the user terminal 20, into the user interface 18 of the vehicle 10. Such a one-time code may be sent by the server 50 to the user terminal 20, via the public network 40, for example during the execution of the application enabling the identifiers to be entered in step E2 in some embodiments, as mentioned above. In a variant, the one-time code could be transmitted (in the form of a short message or SMS, for "Short Message System", for example) to the user terminal 20, using the telephone number (MSISDN number) associated with the subscription used by the user terminal 20, particularly where this number forms the user identifier, as also mentioned above. In the latter case, the server 50 is designed to send data on the telephone network.

In some embodiments, it is then possible to proceed to the starting of a counter within the electronic control unit 11, using the construction information stored in the storage unit 14 as mentioned above: in the embodiment described here, the counter is initialized to the initial value I and is incremented periodically with a period P (step E36). When the counter is stored in a given number of bits, it is reset to zero on the occurrence of an incrementation causing an overflow (according to the English terminology which is sometimes used) beyond the maximum value (determined by the number of bits of the counter).

The electronic control unit 11 also sends a message to the server S, indicating that the user's presence has been detected (from the actions ACT performed by the user at the request of the electronic control unit 11) and that the service may therefore be started (step E38).

The server S receives this message and, if a counter is used, also starts its internal counter (step E40), in association with the vehicle identifier VID and on the basis of the construction information stored in association with the serial number N of the electronic control entity 11, in this case the initial value I and the period P of the incrementation of the counter.

The counter therefore runs in parallel within the control unit 11 and within the server S, possibly with a very slight offset between the counter stored in the electronic control unit 11 and the counter stored in the server 50 (due, notably, to the short time interval between steps E36 and E40); however, this is not harmful.

The server S may then decide to execute the final sign-up of the user U to the service, and for this purpose it stores in association, in a storage area for subscribers to the service, the user identifier UID, the vehicle identifier VID, and, if a counter is used, the current value of the counter (which will be incremented periodically, with the period P), and the serial number N if required (step E42). The user identifier UID and the vehicle identifier VID stored in association may be considered as an electronic certificate of the ownership of the vehicle for the proposed service.

The server S may then communicate to the user U access rights to the service for controlling the functions of the vehicle, for example by transmitting to the user terminal 20 a virtual key VK authorizing the user terminal 20 to control these functions (such as the opening of the doors of the vehicle), as in the examples described below. The virtual key VK is stored in the user terminal 20 (step E44). In practice, the virtual key VK may be transmitted from the server 50 to an application previously downloaded to the memory 24 of the user terminal 20 and executable by the processor 22 of the user terminal 20, for example the application for executing step E2 as discussed above. In a variant, the virtual key VK could be transmitted to the user terminal 20 by using the telephone number (MSISDN number) associated with the subscription used by the user terminal 20, particularly where this number forms the user identifier, as also discussed above.

Figure 4:
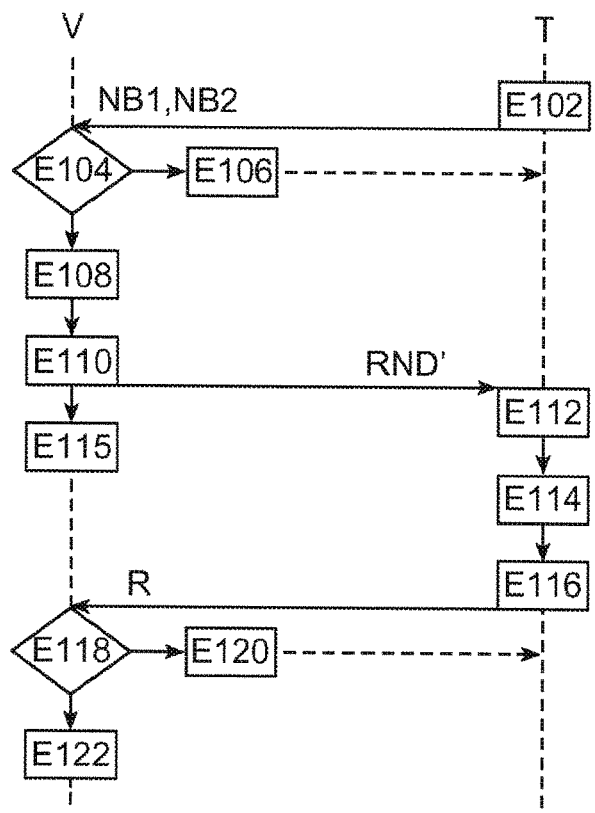
FIG. 4 shows the main steps of an example of a method for signing up to a service for controlling a function of the vehicle by means of the user terminal.

FIG. 4 shows the main steps of an example of a method for controlling a function of the vehicle V (referenced "10" in FIG. 1) by means of the user terminal T (of the type referenced "20" in FIG. 1).

Naturally, steps other than those described below may be executed in practice, particularly in advance, in order to establish a communication channel between the electronic control unit 11 of the vehicle 10 and the user terminal 20.

The control method described here is particularly suitable for the case in which the vehicle V is hired to a user for a predefined period of time.

For this purpose a temporary virtual key VK is used, this key being derived by taking into account the value NB1 of the counter (installed in parallel in the electronic control unit 11 of the vehicle V and in the server S, as mentioned above) at the start of the hire period and the value NB2 of the counter at the end of the hire period.

In order to generate the virtual key VK, the server S receives, for example, from the vehicle hire company, the vehicle identifier VID, the time of the start of hire and the time of the end of hire, and determines, on the basis of the counter construction information read from the storage unit 14, the value NB1 of the counter installed in the electronic control unit 11 concerned (whose serial number N is associated with the vehicle identifier VID received, following the method of FIG. 3, for example), corresponding to the start of hire time, and the value NB2 of this counter corresponding to the end of hire time.

The virtual key VK is then generated, using the root key MK (stored in association with the serial number N, as mentioned above), the start value NB1 and the end value NB2, for example by using a derivation function g with these elements: VK=g(MK,NB1,NB2).

The server S then transmits the virtual key VK and the values NB1, NB2 to the usual terminal T (a cellphone, for example) of the user (the vehicle hirer), for example after a step of verification that this usual terminal T is actually eligible for the service (on the basis of an identifier of the terminal, such as an IMEI number, and/or a subscriber number associated with the terminal, such as an MSISDN number); the virtual key VK and the values NB1, NB2 are then stored in the terminal T. (It should be noted that the terminal T used here is therefore not normally the one used in the context of FIG. 3.)

The function of the vehicle V may then be controlled by means of the terminal T.

For this purpose, in step E102, the terminal T sends a request for the execution of the function, accompanied by the start value NB1 and the end value NB2, to the electronic control unit 11 of the vehicle V (step E102).

The electronic control unit 11 then verifies, in step E104, that the current value of the counter that it executes is actually between the value NB1 and the value NB2 (which means, according to the construction of the values NB1 and NB2 described above, that the current instant is included in the hire period).

If this is not the case, the electronic control unit 11 terminates the method in step E106, without executing the required function (i.e. unlocking the doors of the vehicle V, in this case). A failure message may be transmitted, if necessary, to the terminal T so that a corresponding indication can be displayed on the terminal T.

If there is a positive verification in step E104, the method continues to step E108, in which the electronic control unit 11 calculates the virtual key VK on the basis of the root key MK (stored, as indicated above, in the storage unit 14), the start value NB1 and the end value NB2, according to the same calculation as that carried out as indicated above in the server S, in this case by the application of the derivation function g to these elements: in this case, the electronic control unit 11 calculates VK=g(MK,NB1,NB2).

Then, in step E110, the electronic control unit 11 generates a challenge, for example a random number RND', and sends this challenge to the user terminal T.

The user terminal T receives this challenge in step E112.

In step E114, the user terminal T (that is to say, in practice, its processor) applies to the received challenge RND' a cryptographic function h using the virtual key VK (received from the server S previously, as mentioned above) and thus obtains a response R: R=h(RND',VK). If necessary, other data, for example the vehicle identifier VID, may be used in the calculations performed in this step.

In parallel, the electronic control unit performs an identical calculation in step E115 (in normal operation) in order to obtain the expected response on his side; the result of this calculation is denoted R' in this case: R'=h(RND',VK).

The user terminal T sends the expected response R (calculated in step E114) to the electronic control unit 11 (step E116).

The electronic control unit 11 then verifies, in step E118, that the response R received from the user terminal T is actually equal to the expected response R', in which case the electronic control unit 11 may consider that the user terminal T does actually hold the virtual key VK giving a right of access to the vehicle.

If the verification fails in step E118, (which is not the case in the normal operation described above, but may be the case when a malicious person attempts to access the vehicle without knowing the virtual key VK), the electronic control unit 120 terminates the method in step E120, without executing the required function (that is to say, without unlocking the doors of the vehicle V in this case). A failure message may be transmitted, if necessary, to the terminal T so that a corresponding indication can be displayed on the terminal T.

If the equality between the response R received from the user terminal T and the expected response R' calculated by the electronic control unit 11 is verified in step E118, the method proceeds to step E122, in which the electronic control unit executes the requested function, in this case unlocking the doors of the vehicle, by sending a corresponding command to the actuator 15 (or, in the case of starting the vehicle, to the actuator 17).

In the example described above, a simple authentication is used, however, provision may be made in a variant to use mutual authentication, for example when the desired function is the starting of the vehicle.

Additionally, in the case described above, a temporary virtual key VK, particularly suitable for vehicle hire, is used.

In other embodiments, it would be possible to use a fixed virtual key VK, for example a key stored in the storage unit 14 in place of the root key MK. Steps E102 and E110 to E122, described above, for controlling the function of the vehicle with the user terminal, can then be executed using this fixed virtual key. The user terminal where the virtual key VK is stored may, in this case, be the user terminal used in the method of FIG. 3. It would also be possible not to use the aforementioned counter, in which case steps E36, E40 and E104 to E108 would be omitted, and step E102 would be a simple request for execution of the function, without the addition of counter values.

Figure 5:
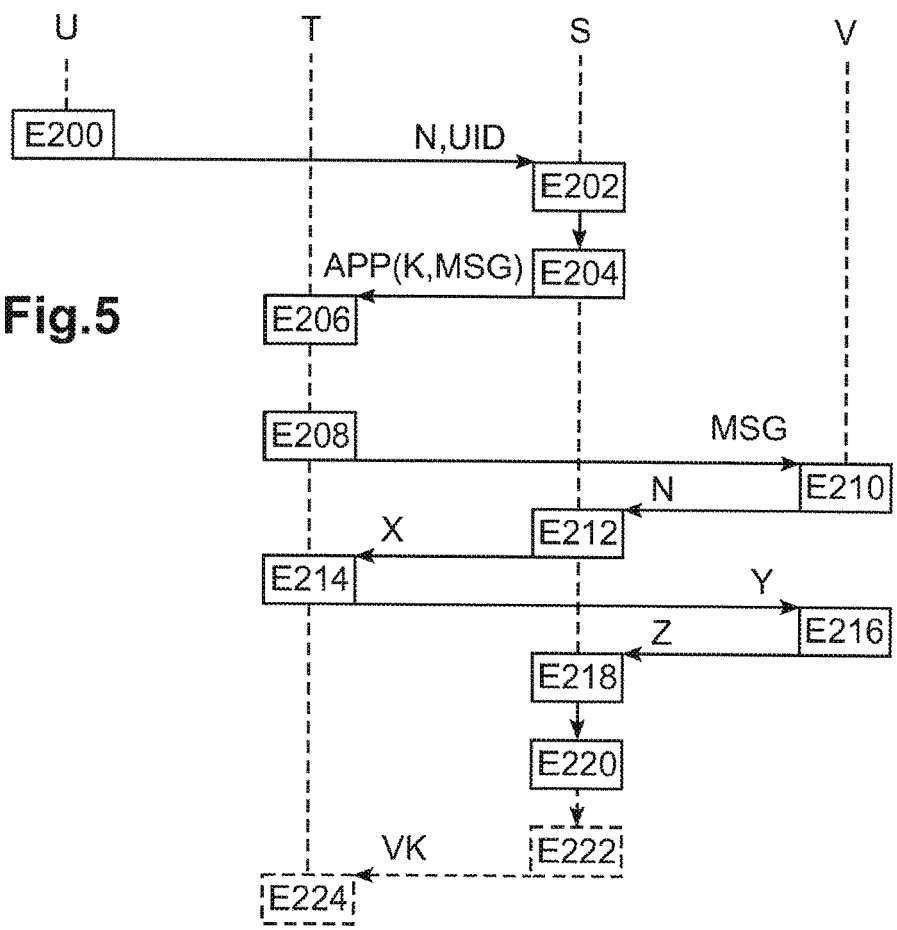
FIG. 5 shows the main steps of another example of a method for signing up to a service for controlling functions of the vehicle by means of the user terminal.

FIG. 5 shows the main steps of another example of a method for signing up to a service for controlling functions of the vehicle 10 by means of the user terminal 20.

This method starts at step E200, in which the user U (normally the owner of the vehicle V) communicates the serial number N of the electronic control unit 11 and his identifier UID (for example an identifier of the user terminal 20, such as the IMEI number or the associated MSISDN subscriber number) to the server S.

Clearly, in the present embodiment, the serial number N is used as an identifier associated with the vehicle 10.

To communicate this information to the server S, the user U connects, for example, to a website associated with the server S, and can then enter the information N, UID into a form which is subsequently transmitted to the server S. These operations may if necessary be performed by using the terminal 20, but also by using a personal computer of the user U.

The server S receives the information N, UID in step E202 and stores it, for example in a storage area dedicated to vehicles for which the sign-up to the service for controlling functions of the vehicle by means of the user terminal is in progress.

It should be noted that, in a variant, this information N, UID could be entered into the server S at the time of purchase of the vehicle V (in which case the user U would supply the information relating to him to the organization managing the server S).

The server S then prepares, in step E204, an application APP intended for the terminal 20, this application containing a specific message MSG (designed to be read solely by the electronic control unit 11 whose serial number N has been received in step E202) and a derivation key K specific to the application APP. The server S stores, notably, the derivation key K in association with the previously stored information N, UID.

The application APP is downloaded and installed on the terminal 20 (referred to hereinafter as "the terminal T") in step E206. For this purpose, the server S transmits, for example, an https link to the terminal 20 (for example by using the MSISDN subscriber number supplied in step E200 as the identifier UID, or supplied in step E200 as a complement to the identifier UID), this link being used subsequently by the user U for downloading the application APP to the terminal T.

In a subsequent step E208 (which may be separated from step E206 by a longer or shorter time interval), the user U starts the execution of the application APP on the terminal T.

After a phase of initializing the wireless link between the wireless communication module 16 of the vehicle V and the wireless communication module 26 of the terminal T, the application APP causes the specific message MSG to be sent to the electronic control unit 11 of the vehicle V.

The specific message MSG is received in step E210 by the electronic control unit 11, which verifies that this specific message MSG is actually intended for it. If this verification does not take place correctly, the sign-up process is terminated.

If the electronic control unit 11 is actually the intended recipient of the specific message MSG, the electronic control unit 11 sends an authentication request, in step E210, to the server S, accompanied for example by its serial number N (or other identifier of the electronic control unit 11). Such a request is, for example, transmitted from the electronic control unit 11 to the server S via the terminal T (as explained above in relation to the embodiment of FIG. 3). For this purpose, the application APP contains, for example, an IP address of the server 50, and transmits to this address the response that it receives from the electronic control unit 11. In a variant, this request could be transmitted by means of a communication module of the vehicle V.

The server S receives the authentication request and the serial number N, and then, in step E212, sends a challenge X to the terminal T (whose identifier or associated subscription number has been stored, as mentioned above, at the server S in association with the identifier associated with the vehicle, in this case the serial number N).

The terminal T receives the challenge X and applies to this challenge X (step E214) a cryptographic function d, using the derivation key K, received previously with the application APP (see step E206 described above), in order to obtain a derived data element Y: $Y=d(X,K)$.

The derived data element Y is transmitted from the terminal T to the electronic control unit 11 of the vehicle V via the wireless link established as mentioned above in step E208.

The electronic control unit 11 receives the derived data element Y and calculates a response Z in step E216, by applying to this derived data element Y a cryptographic function f using the cryptographic key PrK which has been stored as mentioned above in the storage unit 14: $Z=f(Y, PrK)$.

The electronic control unit 11 sends the response Z calculated in step E216 to the server S, for example via the terminal T as mentioned above (or in a variant, by means of a communication module fitted in the vehicle V).

The server S receives the response Z and can thus verify, in step E218, that this response Z is actually the expected response $f(d(X,K),PrK)$. This is because the server S stores, in association with the serial number N of the electronic control unit 11, the cryptographic key PrK (as described above with reference to FIG. 2) and the derivation key K (see step E204 above); the server S also knows the challenge X that it sent in step E212.

If the response Z received from the electronic control unit 11 does not correspond to the expected response $f(d(X,K), PrK)$, the sign-up process is terminated.

If the response Z received from the electronic control unit 11 corresponds to the expected response $f(d(X,K),PrK)$, this means that the terminal T and the electronic control unit 11 of the vehicle V, each of which has participated in the production of the response Z (with each of them using information specific to them), are actually those which are associated, respectively, with the user U (identified by his identifier UID) and with the vehicle V (identified here by the serial number N): thus the server S has been able to authenticate the terminal T and the electronic control unit 11.

The server S then decide to execute the final sign-up of the user U to the service for controlling the functions of the vehicle V by means of the terminal T, and for this purpose, in step E220, it stores, in a storage area for subscribers to the service, the user identifier UID (for example, as mentioned above, an identifier associated with the terminal T) in association with the vehicle identifier associated with the vehicle (in this case, the serial number N).

The server S may then communicate to the user U access rights to the service for controlling the functions of the vehicle, for example by transmitting to the terminal T (in step E222) a virtual key VK authorizing the terminal T to control these functions, as in the examples described above. The virtual key VK may thus be stored in the user terminal T (step E224).

In some embodiments, provision may be made for the access rights not to be transmitted immediately after the final sign-up, but subsequently, for example after the transmission of an email message to the user U (at an email address entered in step E200, for example), and after the confirmation of the activation of the service by the user U in response to this email message, for example by entering a code mentioned in the email message into the terminal T.

The invention claimed is:

1. A method for signing up a user to a service for controlling at least one function of a vehicle by a user terminal, the method comprising:
communicating an identifier of the user and an identifier associated with the vehicle to a server;
authenticating, by the server, an electronics unit of the vehicle,
wherein authenticating the electronics unit comprises:
transmitting, from the server to the electronics unit, a predetermined number and a first portion of a response to a cryptographic function based on the predetermined number,
wherein the electronics unit verifies the server using the first portion of the response and the cryptographic function with the predetermined number to generate a second portion of the response,
wherein the first portion is different from the second portion,
wherein the response is formed from the first portion of the response and the second portion of the response, and
wherein the first portion is the least significant byte of the response and the second portion is the most significant byte of the response; and
upon successful authentication, signing up the identifier of the user and the identifier associated with the vehicle, in association, at the server.

2. The method as claimed in claim 1, wherein authenticating the electronics unit further comprises determining, by the server, a cryptographic key among a plurality of cryptographic keys using the identifier associated with the vehicle, and wherein the cryptographic key is stored in the electronics unit.

3. The method as claimed in claim 1, wherein authenticating the electronics unit further comprises exchanging data between the server and the electronics unit via the user terminal.

4. The method as claimed in claim 1, wherein the authentication step forms part of a mutual authentication process between the server and the electronics unit.

5. The method as claimed in claim 1, further comprising detecting an action performed by the user on a physical object linked to the vehicle, the sign-up also being conditional on said detection of the action.

6. The method as claimed in claim 5, wherein the detection of the action is performed solely upon successful authentication.

7. The method as claimed in claim 6, further comprising, upon successful detection of the action, sending, by the electronics unit, a service start message to the server, said sign-up being performed by the server on receipt of the service start message.

8. The method as claimed in claim 5, wherein the physical object is a physical key capable of controlling an unlocking of a plurality of doors of the vehicle.

9. The method as claimed in claim 1, further comprising:
downloading, from the server to the terminal, an application containing a specific message intended for an electronic control entity corresponding to the identifier associated with the vehicle; and
transmitting, as a result of the execution of the application on the terminal, the specific message to the control unit of the vehicle.

10. The method as claimed in claim 1, wherein the identifier of the user is an identifier of the user terminal.

11. The method as claimed in claim 1, further comprising, upon successful authentication, initializing a counter in the server and in the electronics unit.

12. The method as claimed in claim 11, wherein the counter is initialized with an initialization value stored in the server and in the electronics unit, and wherein the counter is incremented periodically with a period stored in the server and in the electronics unit.

13. The method as claimed in claim 1, comprising, following said sign-up, transmitting a virtual key to the terminal.

14. The method as claimed in claim 1, wherein the communication step is executed by transmitting, by the user terminal, the identifier of the user and the identifier associated with the vehicle to the server.

15. The method as claimed in claim 1, wherein the communication step is executed by entering the identifier of the user and the identifier associated with the vehicle into the server.

16. The method as claimed in claim 2, wherein authenticating the electronics unit further comprises generating the first portion of the response using the cryptographic key with the cryptographic function.

17. The method as claimed in claim 1, wherein the first portion of the response is associated with a challenge by the server, and wherein the second portion of the response is associated with an expected response to the challenge.

* * * * *